No. 838,164. PATENTED DEC. 11, 1906.
W. W. BISSELL.
DEVICE FOR SHAPING METAL.
APPLICATION FILED AUG. 4, 1906.

4 SHEETS—SHEET 1.

WITNESSES.
M. A. Keller
C. E. Eggers.

INVENTOR.
William W. Bissell
by James K. Bakewell
his attorney

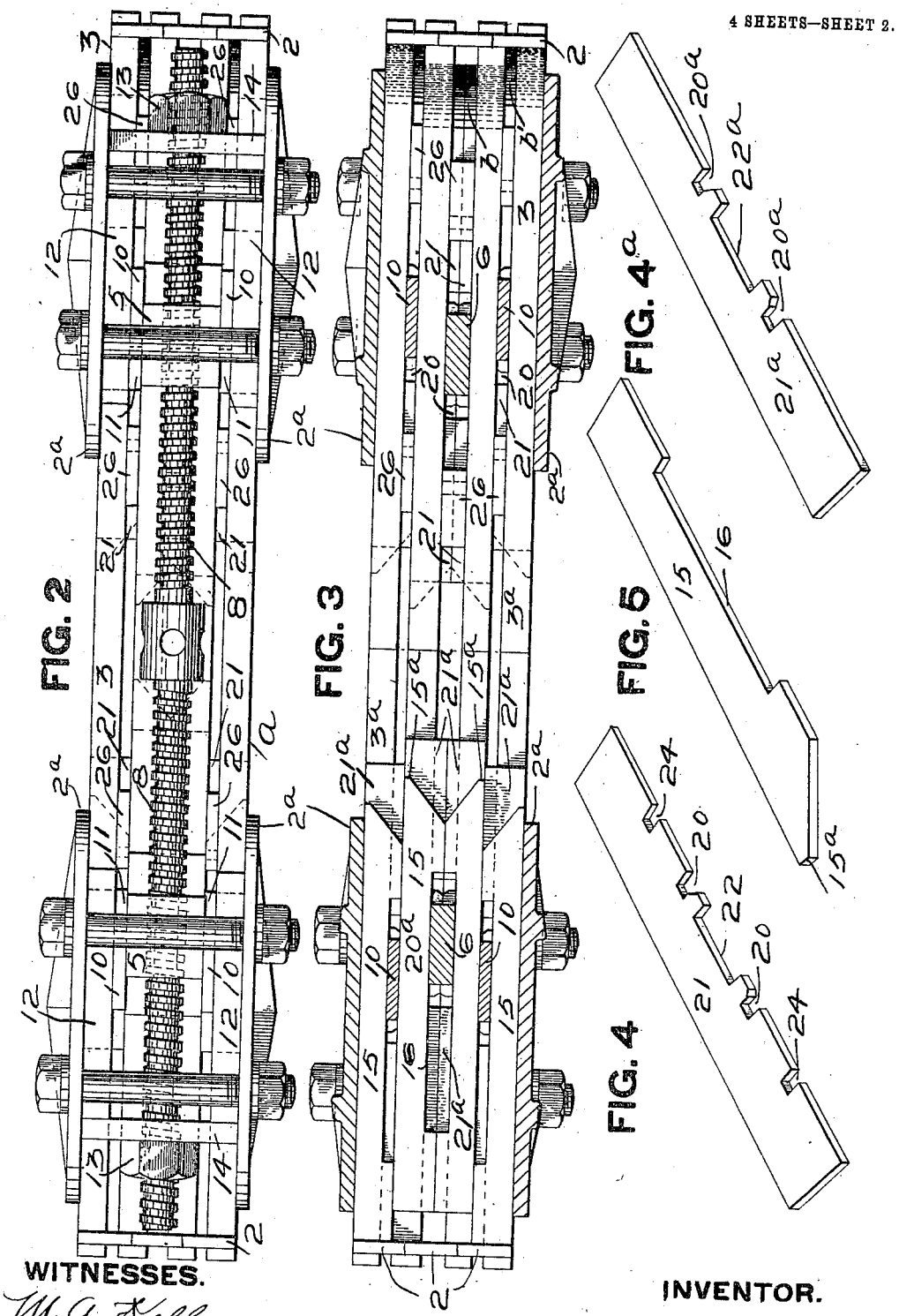

No. 838,164. PATENTED DEC. 11, 1906.
W. W. BISSELL.
DEVICE FOR SHAPING METAL.
APPLICATION FILED AUG. 4, 1906.

4 SHEETS—SHEET 3.

WITNESSES.
M. A. Keller
C. E. Eggers.

INVENTOR.
William W. Bissell
by James C. Bakewell
his attorney

No. 838,164. PATENTED DEC. 11, 1906.
W. W. BISSELL.
DEVICE FOR SHAPING METAL.
APPLICATION FILED AUG. 4, 1906.
4 SHEETS—SHEET 4.
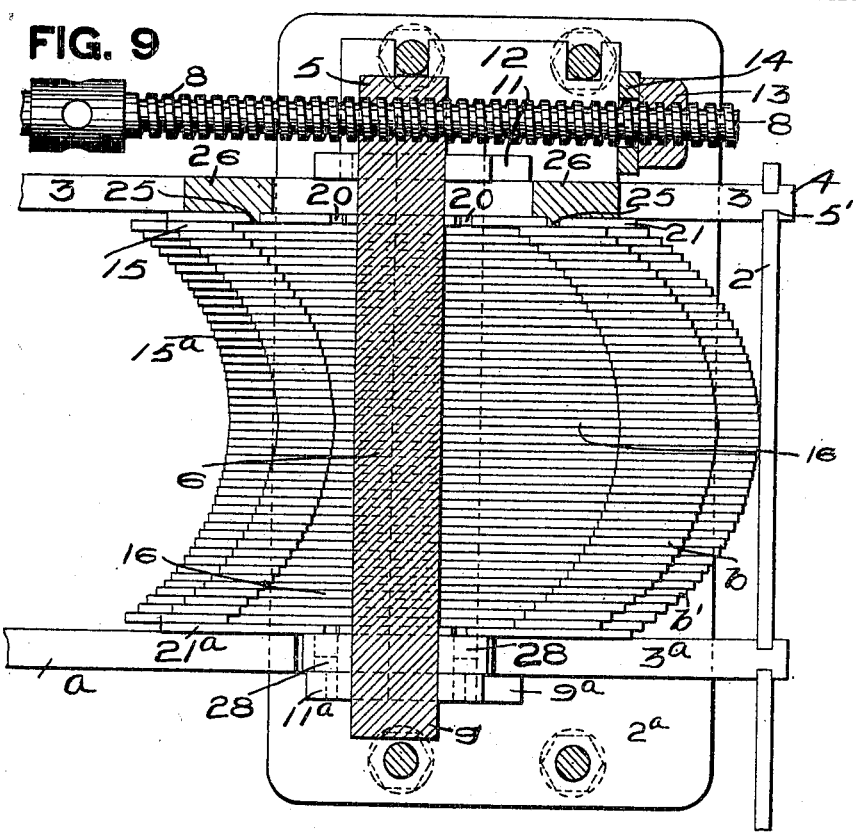
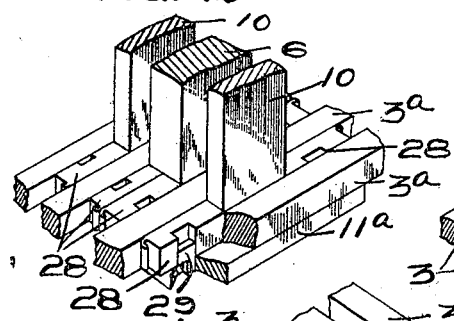
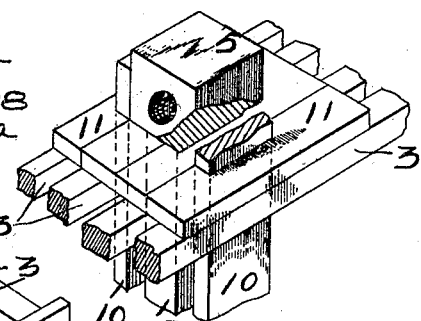
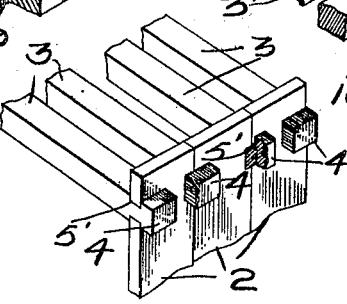
WITNESSES.
INVENTOR.

UNITED STATES PATENT OFFICE.

WILLIAM W. BISSELL, OF BEAVER, PENNSYLVANIA.

DEVICE FOR SHAPING METAL.

No. 838,164.   Specification of Letters Patent.   Patented Dec. 11, 1906.

Application filed August 4, 1906. Serial No. 329,149.

*To all whom it may concern:*

Figure 1:
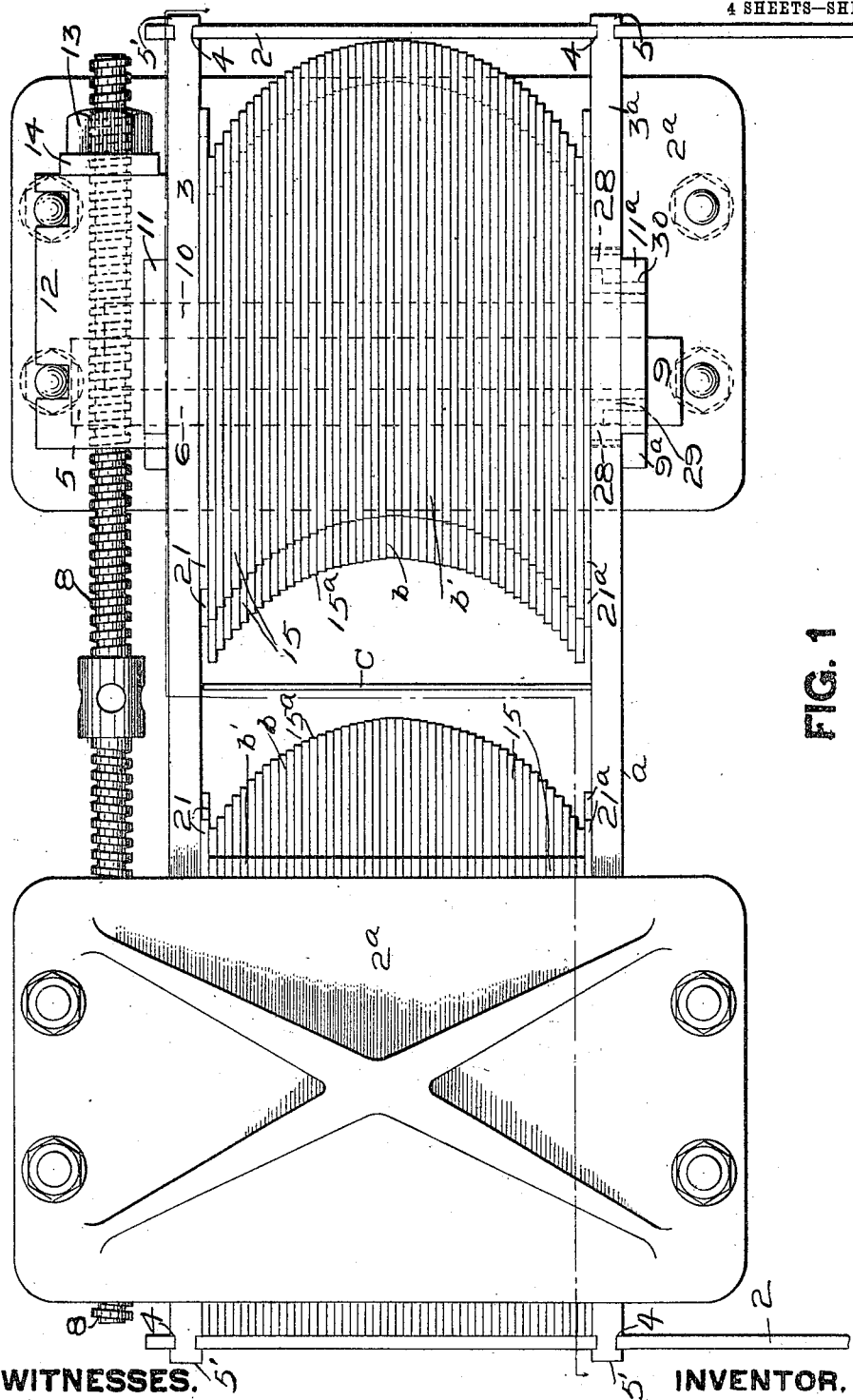
Figure 6:
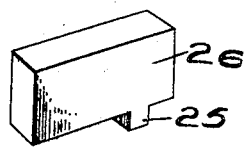
Figure 7:
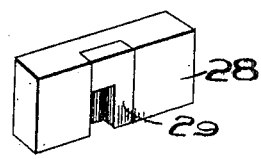
Figure 8:
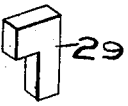
Figure 13:
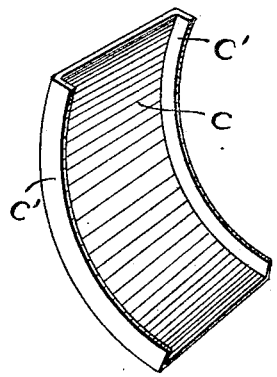
Figure 14:
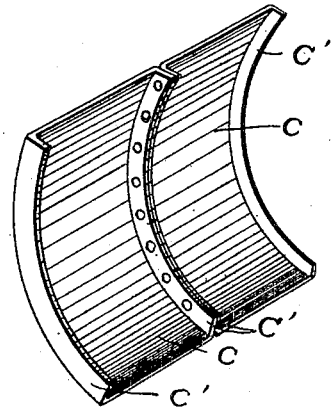

Be it known that I, WILLIAM W. BISSELL, of Beaver, in the county of Beaver, State of Pennsylvania, have invented a certain new and useful Device for Shaping Metal, of which the following is a full, clear, and exact description, reference being had to the accompanying drawings, forming part of this specification, in which—
Figure 1 is a side elevation of dies which may be employed in carrying out my invention, one of the side plates of the dies being removed. Fig. 2 is a plan view of these dies. Fig. 3 is a horizontal sectional view on the line IV IV of Fig. 1. Fig. 4 is a detached perspective view of one of the upper separable bars. Fig. 4ª is a view of one of the lower separable bars. Fig. 5 is a like view of one of the separable bars which is used in building up the die. Fig. 6 is a detached perspective view of one of the top shot-guards adapted to fit in between the horizontal bars of the frame of the apparatus. Fig. 7 is one of the lower shot-retaining blocks fitting between the lower horizontal bars of the frame. Fig. 8 is a like view of the locking-dog of this lower shot-retaining block. Fig. 9 is a vertical sectional view of half of the frame containing the built-up dies therein.
Fig. 10 is a perspective view of a portion of the vertical connecting-bars, horizontal beams, the shot-retaining blocks, and a portion of the lower slide. Fig. 11 is a perspective view showing the upper block, the horizontal beams, and the vertical connecting-bars. Fig. 12 is a perspective view of the vertical beams and the horizontal beams. Fig. 13 is a perspective view of a strip of metal after it has been formed in the dies, and Fig. 14 is a like view of two of such metal sections riveted together in the manufacture of boats.

Like symbols of reference indicate like parts wherever they occur.
My invention relates to a method of shaping metal forms.

It is especially adapted to shaping sheet metal in sections to be used in the manufacture of boats and other articles; and it consists in building up dies suitable to produce the desired form and shape, said dies being built up of separable parts, suitably locked together, and in pressing sheets or strips of metal in the dies so built to produce the metal shape desired.

I will now describe my invention so that others skilled in the art may manufacture and use the same.

In the drawings, *a* represents the frame of the dies, which may be composed of the vertical beams 2, arranged side by side and interlocking with the horizontal beams 3 by means of the heads 4 and slots 5, or any other suitable means for securing the vertical and horizontal beams may be employed. The horizontal beams 3 may be four in number, spaced suitable distances apart, the middle space being sufficiently large to receive the vertical connecting-bar 6, which extends from the blocks 5 down to and ends in a head 9 below the lower tier of horizontal beams 3ª. The frame may be made more rigid by means of side plates 2ª, which are removable to allow the building up of the dies *b*. These blocks 5 are threaded, one block having a right-hand thread and the other a left-hand thread, adapted to receive the threaded shaft 8, one end of which has a right-hand thread and the other a left-hand thread. The outer spaces between the horizontal beams 3 and 3ª are sufficiently large to receive the vertical connecting-bars 10, which at the top and bottom are secured to the slides 11 and 11ª, which slides are adapted to be moved on the outer faces of the horizontal beams 3 and 3ª by heads or plates 12, which engage with blocks 14 and nuts 13, which nuts 13 are adapted to engage with the threads of the shaft 8. These devices constitute a movable frame having an inner vertical connecting-bar 6, adapted to move in either direction on the threaded shaft, and two other vertical connecting-bars 10 also adapted to move back and forth in line with the threaded shaft 8, but independently of the inner vertical connecting-bar 6.

The purpose of the fixed frame *a* is to support the separable dies 15, which together form the shaping-dies *b*, which engage with and are adapted to be moved by the connecting-bars 6 and 10, moving in the frame *a* in the manner already described. These separable dies 15 are composed of steel bars, preferably having their operating ends cut at an angle to form bending edges 15ª, and the bars are provided with extended cut-away portions or spaces 16, in which the vertical connecting-bars 6 and 10 lie, the cut-away portions being of much greater extent than the breadth of the bars 6 and 10. This enables the separable dies to be built up preferably in four tiers about the bars 6 and 10, two tiers of dies being built about each of the connecting-bars 6 and one tier of dies being built about each of the connecting-bars 10. By properly spacing these bars or separable dies 15 longitudinally any shape may be given to the solid dies b, formed of the separable bars 15 up to a half-circle. Of course in building up the dies a concave portion of the face must be opposite a convex portion on the other die b at the other end of the frame a. After the dies b have been formed to the desired shape, which may be done by the eye or it may be done by the use of a pattern placed at the ends of the bars 15, the bars 15 are locked in this position, preferably by means of steel shot, which are admitted through suitable openings 20 in the top shot-retaining bars 21 at the top of the frame a in such a manner as to fill up the cut-away portions 16 of the bars 15 on each side of the connecting-bars 6 and 10, thus locking the bars 15 on the connecting-bars. I may use Babbitt metal or other suitable material instead of the shot, which metal may be poured into these spaces in a molten condition. I will, however, describe the use of steel shot as being the preferable means of locking the bars 15, although I do not desire to limit myself thereto.

On top of each tier of the series of separable dies 15 is a top shot-retaining bar 21, (shown in Fig. 4,) which bar is provided with a short cut-away portion 22 for the passage of the connecting-bars 6 and 10, and they are also provided with slots 20, which register with the cut-away portions 16 of the separable dies 15, the purpose of these slots 20 being to permit the introduction of the steel shot into the spaces 16. The bars 21 are also provided with slots 24, which receive the lugs 25 of the shot-guide blocks 26, which block up the space between the horizontal bars 3 at this point, the purpose being to prevent the shot from escaping along the top of the bar 21. At the bottom of each tier of the separable dies 15 are bottom shot-retaining bars $21^a$, (shown in Fig. $4^a$,) which bars are provided with short cut-away portions $22^a$ for the passage of the vertical connecting-bars 6 and 10, and they are also provided with slots $20^a$, through which the shot may be discharged when desired from the spaces 16. These openings $20^a$ are normally closed by means of the shot-retainers 28, which are provided with locking-dogs 29, which locking-dogs pass through openings 30 in the slides $9^a$ and $11^a$. In order to remove the shot-retainer, and so release the separable dies 15 to enable the face of the die b to be reshaped, the dogs 29 are raised in the slots 30 sufficiently above the level of the bottom plates $11^a$ and $9^a$ to allow the withdrawal of the blocks 28 from between the horizontal bars 3. When the blocks 28 are withdrawn, the shot will escape from the spaces 16 under the force of gravity.

The operation of these dies is as follows: The dies b b' being brought to the desired shape, the inner die b, as shown in the drawings, being of such curved form as to shape the sheet of metal to the proper curve for a section-plate of a boat and the other dies b' being of such shape as to form flanges c' on the sheet of metal, the sheet of metal c is placed between the dies, and the dies b are first brought together, pressing the metal plate c to the curved form. The outer dies b' are then advanced to press the flange c' on each edge of the curved portion already formed by the inner dies. The flanges c' may be riveted together in building the boat, as is shown in Fig. 14 of the drawings, thus forming strengthening-ribs and preventing the presence of rivet-heads on the outer surface of the metal plate. This is an important part of my invention, which results from my improved method of forming the dies, enabling flanges of the desired size and shape to be made by proper adjustment of the separable dies 15. Many variations may be made in the forms of the dies b and b' to adjust them to the manufacture of different shapes of metal.

The advantages of my invention will be appreciated by those skilled in the art. By following the method of forming dies of separable pieces and locking them in a suitable frame a die of any desired shape up to a half-circle may be produced. Although I have described apparatus and parts thereof which are especially adapted to this purpose I do not desire to limit myself thereto.

Having thus described my invention, what I claim, and desire to secure by Letters Patent, is—

1. In apparatus for shaping metal, the combination of separable dies having cut-away portions, connecting-bars, and steel shot for filling that part of the cut-away portions not filled by the connecting-bars; substantially as specified.

2. In apparatus for shaping metal, the combination of separable bars forming dies, connecting-bars for connecting the die-bars, shot-retaining pockets, upper and lower shot-retaining bars, inlet and outlet apertures, and removable stoppers for closing the outlet-apertures; substantially as specified.

3. In apparatus for shaping metal, separable bars forming dies, connecting-bars for connecting the die-bars together, pockets formed in the separable die-bars, and a removable filling for filling the pockets about the connecting-bars; substantially as specified.

4. In apparatus for shaping metal, separable bars forming dies, connecting-bars for connecting the die-bars together, pockets formed in the separable die-bars and a removable filling for filling the pockets.

5. In apparatus for shaping metal, middle dies having separable bars, connecting-bars, pockets, and a removable filling for filling the pockets in combination with outer dies, and arranged to bend the metal in different directions.

In testimony whereof I have hereunto set my hand.

WILLIAM W. BISSELL.

Witnesses:
JAMES K. BAKEWELL,
C. E. EGGERS.